[54] CERTAIN THENOYL DERIVATIVES OF BENZENSULFONYLAMINOPYRIMIDINES

[75] Inventors: Ruth Heerdt, Mannheim-Fendenheim; Manfred Hubner, Ludwigshafen/Rhine; Felix Helmut Schmidt, Mannheim-Seckenheim; Rudi Weyer, Frankfurt/M.-Unterliederbach, all of Germany

[73] Assignee: Boehringer Mannheim GmbH, Mannheim, Germany

[22] Filed: June 1, 1970

[21] Appl. No.: 42,512

[30] Foreign Application Priority Data

June 7, 1969 Germany..................P 19 29 232.5

[52] U.S. Cl. ......260/256.5 R, 260/332.2 C, 424/251
[51] Int. Cl. ..........................................C07d 51/42
[58] Field of Search.............................260/256.5 R Primary Examiner—Alex Mazel
Assistant Examiner—R. J. Gallagher
Attorney—Burgess, Dinklage & Sprung

[57] ABSTRACT

Certain novel sulfonylaminopyrimidines having the general formula

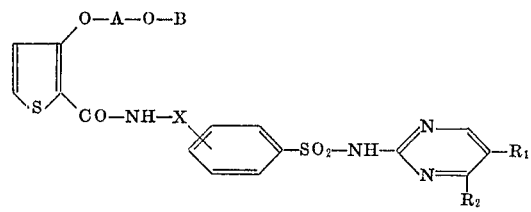

wherein A is a lower alkylene radical, B is a lower alkyl radical, X is a straight or branched-chain lower alkylene radical, $R_1$ is a straight or branched-chain alkyl, cycloalkyl, cycloalkyl-alkyl, aryl, e.g., phenyl or naphthyl, aralkyl, e.g., benzyl or naphthyl-ethyl, alkoxy, cycloalkoxy, alkoxyalkyl, alkoxyalkoxy or alkylmercapto radical and $R_2$ is a hydrogen atom or a lower alkyl radical and wherein $R_1$ and $R_2$ can, together, also form an alkylene ring of three to five methylene radicals, as well as the physiologically compatible salts thereof, have strong blood sugar reducing activity.

9 Claims, No Drawings

CERTAIN THENOYL DERIVATIVES OF BENZENSULFONYLAMINOPYRIMIDINES

The present invention relates to novel sulfonylaminopyrimidines and to pharmaceutical compositions, specifically antidiabetic compositions, containing them.

Furoyl- and thenoyl-aminoalkyl-benzene-sulfonylaminopyrimidines having blood sugar reducing properties are known from Belgian Pat. specification No. 685,537.

The compounds of this invention are of the general formula:

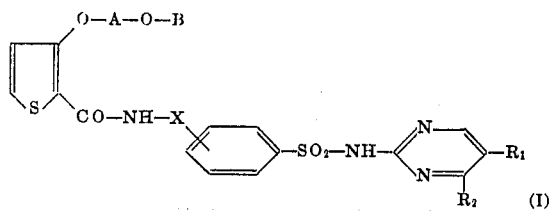

(I)

wherein A is a lower alkylene radical, B is a lower alkyl radical, X is a straight or branched-chain lower alkylene radical, $R_1$ is a straight or branched-chain alkyl, cycloalkyl, cycloalkyl-alkyl, aryl, e.g., phenyl or naphthyl, aralkyl, e.g., benzyl or naphthyl-ethyl, alkoxy, cycloalkoxy, alkoxyalkyl, alkoxyalkoxy or alkylmercapto radical and $R_2$ is a hydrogen atom or a lower alkyl radical and wherein $R_1$ and $R_2$ can, together, also form an alkylene ring of three to five methylene radicals; as well as the physiologically compatible salts thereof. Preferably, the alkyl radicals included within the definitions of $R_1$ and $R_2$ or contained as moieties in other radicals within such definitions, are lower alkyl, e.g., alkyl of from one to 10, most preferably from one to four, carbon atoms.

The compounds of formula (I) have strong blood sugar reducing activity.

The new compounds according to the present invention can be prepared by conventional techniques, for example, by one of the following methods:

a. reaction of compounds of the general formula:

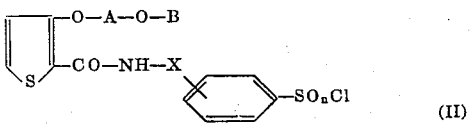

(II)

wherein A, B and X have the same meanings as above and n is 0, 1 or 2, with 2-aminopyrimidines of the general formula:

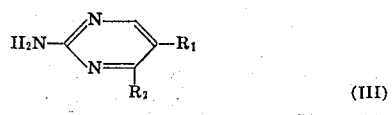

(III)

wherein $R_1$ and $R_2$ have the same meanings as above, where-after, if necessary, the product obtained is oxidized to the corresponding sulfonamide; or b. reaction of substances of the general formula:

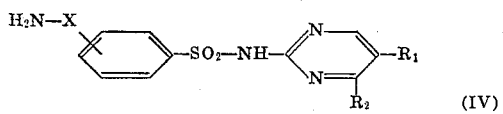

(IV)

wherein $R_1$, $R_2$ and X have the same meanings as above, with reactive derivatives of acids of the general formula:

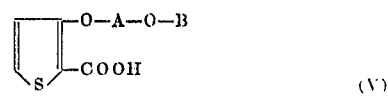

(V)

wherein A and B have the same meanings as above; or c. reaction of sulfonamides of the general formula:

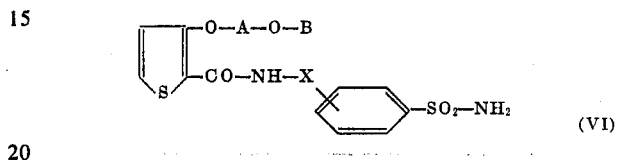

(VI)

wherein A, B and X have the same meanings as above, with pyrimidine derivatives of the general formula:

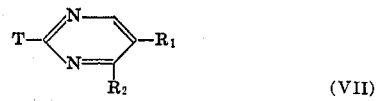

(VII)

wherein $R_1$ and $R_2$ have the same meanings as above and T is a reactive ester group or a lower molecular trialkylammonio group or halogen; or d. reaction of benzene-sulfonyl-guanidines of the general formula:

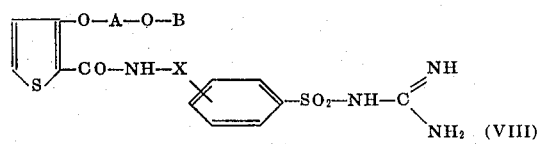

(VIII)

wherein A, B and X have the same meanings as above, with compounds of the general formula:

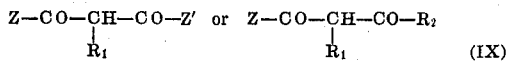

(IX)

wherein $R_1$ and $R_2$ have the same meanings as above and Z and Z', which can be the same or different, are hydrogen atoms or alkoxy radicals, or functional derivatives thereof, whereafter, when the pyrimidines obtained are hydroxylated in the 4- and/or 6-position, they are first converted into the corresponding halogen compounds and subsequently subjected to a reductive dehalogenation in order to give the desired pyrimidines; and the products obtained are, if desired, converted into their physiologically compatible salts by reaction with non-toxic bases.

The reaction of compounds (II) and (III) is preferably carried out in an inert solvent in the presence of a base, preferably with pyridine or trimethylamine. However, it is also possible to use a molar excess of the aminopyrimidine in order to remove the hydrogen chloride formed by the reaction. The subsequent oxidation of sulfenamides or sulfinamides into the corresponding sulfonamides is carried out in the usual manner, for example, by reaction with hydrogen peroxide, potassium permanganate or nitric acid.

The acylation of the compounds (IV) is carried out in the usual manner by reaction with the appropriate acids (V) or with reactive derivatives thereof, preferably in the presence of an acid acceptor.

The condensation of the benzene-sulfonamides (VI) with the pyrimidine derivatives (VII) is preferably carried out in the presence of a base, for example, potassium carbonate. Preferred compounds of general formula (VII) are the 2-halopyrimidines; they can be obtained, for example, by the reaction of 2-hydroxypyrimidines with excess phosphorous oxychloride. Instead of the 2-halopyrimidines (VII), the corresponding trialkylammonio-pyrimidines can also be reacted with the sulfonamides (VI), a trialkylamine being formed as by-product.

The condensation of the benzene-sulfonyl-guanidines (VIII) with the $\beta$-dicarbonyl compounds (IX) can be carried out, for example, by means of an alkali metal alcoholate in an alcohol. The $\beta$-dicarbonyl compounds can be used in their free form or as functional derivatives, for example, acetals; they can, however, also be prepared in a "one pot process" by Vilsmeier's method from aldehyde acetals or ketals or the corresponding enamines, an inorganic acid chloride and a dialkyl formamide. If instead of the dicarbonyl compounds, there are used the corresponding substituted malonic acid diesters, malonic acid ester aldehydes, $\beta$-keto esters or the functional derivatives thereof, then the hydroxyl groups present in the 4- and/or 6- positions of the pyrimidine ring formed must subsequently be replaced by halogen, such as chlorine, by reaction with an inorganic acid halide, which can thereafter be easily replaced by hydrogen by reduction with, for example, zinc dust.

The benzene-sulfonyl-guanidines (VIII) used as starting materials can be prepared, for example, by melting together the appropriate benzene-sulfonamides with guanidine carbonate.

As physiologically compatible salts, the alkali metal, alkaline earth metal and ammonium salts are preferred. They can be prepared in known manner, for example, by reaction with an aqueous solution of sodium hydroxide or of some other alkali metal or alkaline earth metal hydroxide or with an aqueous solution of ammonia or with the corresponding carbonates.

The compounds (I) and the physiologically compatible salts thereof can be administered enterally or parenterally in liquid or solid form in admixture with a solid or liquid pharmaceutical diluent or carrier. As injection medium, it is preferred to use water which contains the additives which are conventional for injection solutions, such as stabilizing agents, solubilizing agents and/or buffers. Additives of this kind include, for example, tartrate and citrate buffers, ethanol, complex-forming agents, such as ethylene-diamine-tetraacetic acid and the non-toxic salts thereof, high molecular weight polymers, such as liquid polyethylene oxide for viscosity regulation. Examples of solid carrier materials include starch, lactose, mannitol, methyl cellulose, talc, highly dispersed silicic acid, high molecular weight fatty acids, such as stearic acid, gelatine, agar-agar, calcium phosphate, magnesium stearate, animal and vegetable fats, solid highly molecular weight polymers, for example, polyethylene glycols. Compositions which are suitable for oral administration can, if desired, also contain flavoring and/or sweetening agents.

The following Examples are given for the purpose of illustrating the present invention.

EXAMPLE 1

4-[$\beta$-(3-Methoxy-methoxy-thenoyl-(2)-amino)-ethyl]-N-[5-isobutyl-pyrimidinyl-(2)]-benzene-sulfonamide 2.82 grams 3-methoxy-methoxy-thiophene-2-carboxylic acid (m.p. 102° – 103°C.) were dissolved in 25 ml. tetrahydrofuran and, at a temperature of –10°C., successively mixed, while stirring, with 2.4 ml. triethylamine and 1.66 ml. ethyl chloroformate. After further stirring for 15 minutes, 5.2 grams 4-($\beta$-aminoethyl)-N-[5-isobutyl-pyrimidinyl-(2)]-benzene-sulfonamide (m.p. 214° – 215°C.) were added and stirring continued for 10 minutes at ambient temperature. The solvent was then evaporated off in a vacuum and the residue triturated with water, filtered off with suction, digested with a mixture of ether and benzene, the residue dissolved in a dilute aqueous solution of sodium hydroxide, the solution obtained treated with activated charcoal, filtered and the product precipitated out by the addition of dilute hydrochloric acid. After recrystallization from methanol, there were obtained 6.0 grams (76% of theory) 4-[$\beta$-(3-methoxy-methoxy-thenoyl-(2)-amino)-ethyl]-N-[5-iso-butyl-pyrimidinyl-(2)]-benzene-sulfonamide, which had a melting point of 151° – 153°C.

EXAMPLE 2

4-[$\beta$-(3-Ethoxy-methoxy-thenoyl-(2)-amino)-ethyl]-N-[5-isobutyl-pyrimidinyl-(2)]-benzene-sulfonamide 2.84 grams 3-ethoxy-methoxy-thiophene-2-carboxylic acid (m.p. 88° – 90°C.) were dissolved in 10 ml. anhydrous tetrahydrofuran, 2.14 grams carbonyl diimidazole added thereto with stirring and, at the end of the evolution of carbon dioxide, 4.6 grams 4-($\beta$-aminoethyl)-N-[5-isobutyl-pyrimidinyl-(2)]-benzene-sulfonamide added. After stirring for 2 hours at ambient temperature, the bulk of the tetrahydrofuran was evaporated off in a vacuum and the residue mixed with water. The crude substance obtained was filtered off with suction, dissolved in a dilute aqueous solution of sodium hydroxide, precipitated out by passing in carbon dioxide, filtered off with suction and washed with water, again dissolved in an aqueous solution of sodium hydroxide and again precipitated out by the addition of hydrochloric acid. The product was finally recrystallized from carbon tetrachloride; there were thus obtained 2.0 grams 4-[$\beta$-(3-ethoxy-methoxy-thenoyl-(2)-amino)-ethyl]-N-[5-isobutyl-pyrimidinyl-(2)]-benzene-sulfonamide, which had a melting point of 153° – 154°C.

EXAMPLE 3

4-[β-[3-(β-methoxy-ethoxy)-thenoyl-(2)-amino]-ethyl]-N-[5-isobutyl-pyrimidinyl-(2)]-benzene-sulfonamide 2.0 grams 3-(β-methoxy-ethoxy)-thiophene-2-carboxylic acid (m.p. 86° – 88°C.) and 5 ml. thionyl chloride were heated under reflux for 3 hours and excess thionyl chloride then completely removed in a vacuum. The liquid carboxylic acid chloride thus obtained was, without further purification, dissolved in 10 ml. anhydrous methylene chloride and, while cooling with ice, added dropwise to a solution of 3.5 grams 4-(β-aminoethyl)-N-[5-isobutyl-pyrimidinyl-(2)]-benzene-sulfonamide hydrochloride (m.p. 264°C.) and 9.5 ml. 2N aqueous sodium hydroxide solution in 30 ml. water. The pH was maintained at about 12 by the gradual addition of further sodium hydroxide solution. After stirring the reaction mixture for a further hour, it was acidified with acetic acid and the methylene chloride evaporated by warming. The precipitated crude product was dissolved in a very dilute aqueous solution of sodium hydroxide, the solution was treated with activated charcoal, filtered and the product precipitated out by passing in carbon dioxide, whereafter it was filtered off, again dissolved in an aqueous solution of sodium hydroxide and precipitated out by the addition of hydrochloric acid. After drying, the product was recrystallized from a mixture of methylene chloride and carbon tetrachloride. There were obtained 3.55 grams (68% of theory) 4-[β-[ 3-(β-methoxy-ethoxy)-thenoyl-(2)-amino]-ethyl]-N-[5-isobutyl-pyrimidinyl-(2)]-benzene-sulfonamide, which had a melting point of 66° – 69°C.

The following compounds were obtained in analogous manner:

4-[β-[3-(β-methoxy-ethoxy)-thenoyl-(2)-amino]-ethyl]-N-[5-propyl-pyrimidinyl-(2)]-benzene-sulfonamide:

After recrystallization from ethanol, it had a melting point of 145° – 147°C. The starting material used was 4-(β-aminoethyl)-N-[5-propyl-pyrimidinyl-(2)]-benzene-sulfonamide; m.p. 227° – 229°C.

4-[β-[3-(β-methoxy-ethoxy)-thenoyl-(2)-amino]-ethyl]-N-[5-methoxy-methyl-pyrimidinyl-(2)]-benzene-sulfonamide:

After recrystallization from ethanol, it had a melting point of 131° – 133°C.
The starting material used was 4-(β-aminoethyl)-N-[5-methoxy-methyl-pyrimidinyl-(2)]-benzene-sulfonamide; m.p. 228° – 231°C.

4-[β-[3-(β-methoxy-ethoxy)-thenoyl-(2)-amino]-ethyl]-N-[5-cyclohexyl-pyrimidinyl-(2)]-benzene-sulfonamide:

After recrystallization from methanol, it had a melting point of 145° – 147°C.
The starting material used was 4-(β-aminoethyl)-N-[5-cyclo-hexyl-pyrimidinyl-(2)]-benzene-sulfonamide; m.p. 269° – 272°C.

4-[β-[3-(β-methoxy-ethoxy)-thenoyl-(2)-amino]-ethyl]-N-[5-cyclohexylmethyl-pyrimidinyl-(2)]-benzene-sulfonamide:

After recrystallization from ethanol, it had a melting point of 136° – 138°C.
The starting material used was 4-(β-aminoethyl)-N-[5-cyclo-hexyl-methyl-pyrimidinyl-(2)]-benzene-sulfonamide hydrochloride; m.p. 265° – 266°C.

4-[β-[3-(β-methoxy-ethoxy)-thenoyl-(2)-amino]-ethyl]-N-[5-benzyl-pyrimidinyl-(2)]-benzene-sulfonamide After recrystallization from ethanol, it had a melting point of 111° – 112°C.
The starting material used was 4-(β-aminoethyl)-N-[5-benzyl-pyrimidinyl-(2)]-benzene-sulfonamide hydrochloride; m.p. 251° – 253°C.

4-[β-[3-(β-methoxy-ethoxy)-thenoyl-(2)-amino]-ethyl]-N-[5-propoxy-pyrimidinyl-(2)]-benzene-sulfonamide:

After recrystallization from ethanol, it had a melting point of 153° – 155°C.
The starting material used was 4-(β-aminoethyl)-N-[5-propoxy-pyrimidinyl-(2)]-benzene-sulfonamide; m.p. 210°C.

4-[β-[3-(β-methoxy-ethoxy)-thenoyl-(2)-amino]-ethyl]-N-[5-(β-methoxy-ethoxy)-pyrimidinyl-(2)]-benzene-sulfonamide:

After recrystallization from ethanol, it had a melting point of 116° – 117°C.
The starting material used was 4-(β-aminoethyl)-N-[5-(β-methoxy-ethoxy)-pyrimidinyl-(2)]-benzene-sulfonamide; m.p. 205°C.

4-[β-[3-(β-methoxy-ethoxy)-thenoyl-(2)-amino]-ethyl]-N-[5-cyclohexyloxy-pyrimidinyl-(2)]-benzene-sulfonamide:

After recrystallization from methanol, it had a melting point of 153° – 155°C.
The starting material used 4-(β-aminoethyl)-N-[5-cyclo-hexyloxy-pyrimidinyl-(2)]-benzene-sulfonamide; m.p. 253° – 254°C.

4-[β-[3-(β-methoxy-ethoxy)-thenoyl-(2)-amino]-ethyl]-N-[5-propyl-mercapto-pyrimidinyl-(2)]-benzene-sulfonamide:

After recrystallization from ethanol, it had a melting point of 150° – 151°C.
The starting material used was 4-(β-aminoethyl)-N-[5-propyl-mercapto-pyrimidinyl-(2)]-benzene-sulfonamide; m.p. 210° – 212°C.

4-[β-[3-(β-methoxy-ethoxy)-thenoyl-(2)-amino]-ethyl]-N-[4-methyl-5-isobutyl-pyrimidinyl-(2)]-benzene-sulfonamide:

After recrystallization from methanol, it had a melting point of 90° – 92°C.
The starting material used was 4-(β-aminoethyl)-N-[4-methyl-5-isobutyl-pyrimidinyl-(2)]-benzene-sulfonamide; m.p. 209° – 211°C.

4-[β-[3-(β-methoxy-ethoxy)-thenoyl-(2)-amino]-ethyl]-N-[5,6,7,8-tetrahydroquinazolinyl-(2)]-benzene-sulfonamide:

After recrystallization from ethanol, it had a melting point of 179°C.
The starting material used was 4-(β-aminoethyl)-N-[5,6,7,8-tetrahydroquinazolinyl-(2)]-benzene-sulfonamide; m.p. 210°-212°C.

4-[β-[3-(β-methoxy-ethoxy)-thenoyl-(2)-amino]-ethyl]-N-[5-ethylmercapto-4-methyl-pyrimidinyl-(2)]-benzene-sulfonamide:

After recrystallization from methanol, it had a melting point of 111°-113°C.
The starting material used was 4-(β-aminoethyl)-N-[5-ethyl-mercapto-4-methyl-pyrimidinyl-(2)]-benzene-sulfonamide; m.p. 221°-223°C.

4-[β-[3-(β-methoxy-ethoxy)-thenoyl-(2)-amino]-propyl]-N-[5-propyl-pyrimidinyl-(2)]-benzene-sulfonamide:

After recrystallization from a mixture of isopropanol and carbon tetrachloride, it had a melting point of 74°-76°C.
The starting material used was 4-(β-aminopropyl)-N-[5-propyl-pyrimidinyl-(2)]-benzene-sulfonamide; m.p. 228°-232°C.

EXAMPLE 4

4-[β-[5-(β-Ethoxy-ethoxy)-thenoyl-(2)-amino]-ethyl]-N-[5-isobutyl-pyrimidinyl-(2)]-benzene-sulfonamide 2.16 grams 3-(β-ethoxy-ethoxy)-thiophene-2-carboxylic acid (m.p. 78° - 80°C.) were reacted with thionyl chloride to give the corresponding acid chloride which was then reacted, in the same manner as described in Example 3, with an aqueous alkaline solution of 2.8 grams 4-(β-amino-ethyl)-N-[5-isobutyl-pyrimidinyl-(2)]-benzene-sulfonamide. After two reprecipitations (see Example 3), the product was recrystallized from ethanol. There were obtained 2.3 grams (52 percent of theory) 4-[β-[3-(β-ethoxy-ethoxy)-thenoyl-(2)-amino]-ethyl]-N-[5-isobutyl-pyrimidinyl-(2)]-benzene-sulfonamide, which had a melting point of 112°-113°C.

The blood sugar reducing activity of test compounds representative of this invention was measured in the rabbit following i.v. administration of the test compounds. In each instance, the threshold dosage, i.e., the lowest dosage of compound required to produce a significant reduction in the blood sugar level, was determined. The values reported in Table I, below, are relative values, based on the standard substance $N_1$-(sulfanilyl)-$N_2$-(n-butyl)urea which has a value of 1. The threshold dosage of this standard substance was 200 mg/kg in this test series.

For purposes of comparison, 2-benzene sulfonamido-5-methoxyethoxypyrimidine (sold under the trade name "Redul") and $N_1$-(sulfanilyl)-$N_2$-(n-butyl)urea, (sold under the trade name "Nadisan"), were also tested under the same conditions.

The results are set forth in Table I, below.

TABLE I

| Compound | Chemical Name | Relative Blood Sugar Reducing Activity |
|---|---|---|
| 1 | 4-[β-(3-methoxymethoxy-thenoyl-(2)-amino)-ethyl]-N-(5-isobutyl-pyrimidinyl-(2)]-benzolsulfonamide | 4,000 |
| 2 | 4-[β-[3-(β-methoxyethoxy)-thenoyl-(2)-amino]-ethyl]-N-[5-isobutyl-pyrimidinyl-(2)]-benzolsulfonamide | 4,000 |
| 3 | 4-[β-(3-ethoxymethoxy-thenoyl-(2)-amino-ethyl]-N-[5-isobutyl-pyrimidinyl-(2)]-benzolsulfonamide | 4,000 |
| 4 | 4-[β-[3-(β-ethoxyethoxy)-thenoyl-(2)-amino]-ethyl]-N-[5-isobutyl-pyrimidinyl-(2)]-benzolsulfonamide | 2,000 |
| 5 | 4-[β-[3-(β-methoxyethoxy)-thenoyl-(2)-amino]-ethyl]-N-[5-propyl-pyrimidinyl-(2)]-benzolsulfonamide | 800 |
| 6 | 4-[β-[3-(β-methoxyethoxy)-thenoyl-(2)-amino]-ethyl]-N-[5-cyclohexyl-pyrimidinyl-(2)]-benzolsulfonamide | 800 |
| 7 | 4-[β-[3-(β-methoxyethoxy)-thenoyl-(2)-amino]-ethyl]-N-[5-propoxy-pyrimidinyl-(2)]-benzolsulfonamide | 800 |
| 8 | 4-[β-[3-(β-methoxyethoxy)-thenoyl-(2)-amino]-ethyl]-N-[4-methyl-5-isobutyl-pyrimidinyl-(2)]-benzolsulfonamide | 400 |
| 9 | 4-[β-[3-(β-methoxyethoxy)-thenoyl-(2)-amino]-ethyl]-N-[5,6,7,8-tetrahydrochinazolinyl-(2)]-benzolsulfonamide | 400 |
| 10 | 4-[β-[3-(β-methoxyethoxy)-thenoyl-(2)-amino]-ethyl]-N-[5-benzyl-pyrimidinyl-(2)]-benzolsulfonamide | 400 |
| 11 | 4-[β-[3-(β-methoxyethoxy)-thenoyl-(2)-amino]-propyl]-N-[5-propyl-pyrimidinyl-(2)]-benzolsulfonamide | 400 |
| A | 2-benzene sulfonamido-5-methoxyethoxypyrimidine ("Redul") | 10 |
| B | $N_1$-(sulfanilyl)-$N_2$-(n-butyl)-urea ("Nadisan") | 1 |

It is evident from the test results set forth in Table I that the compounds of this invention are more effective, by several orders of magnitude, than 2-benzene-sulfonamido-5-methoxyethoxy pyrimidine and $N_1$-(sulfanilyl)-$N_2$-(n-butyl)urea in anti-diabetic effectiveness. The relative blood sugar reducing activity of the instant compounds ranges from 400 to 4000, compared to 10 for sulfonamido and 1 for urea.

The dosage of the novel compounds of the present invention for the treatment of diabetes depends in the main on the age, weight, and condition of the patient being treated. The preferable form of administration is via the oral route in connection with which dosage units containing 5 - 500 mg. of active compound in combination with a suitable pharmaceutical diluent is employed. One or two unit dosages are good from one to four times a day.

What is claimed is:
1. A sulfonylaminopyrimidine of the formula:

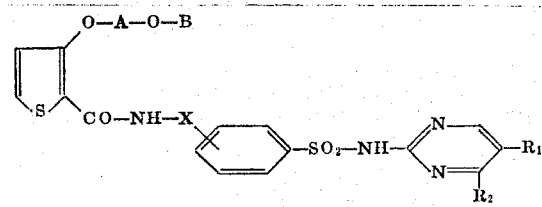

wherein A is alkylene, B is alkyl, X is alkylene, $R_1$ is alkyl, cyclohexyl, cyclohexylalkyl, aryl, aralkyl, alkoxy, cyclohexyloxy, alkoxyalkyl, alkoxyalkoxy, or alkylmercapto, $R_2$ is hydrogen or alkyl, and $R_1$ and $R_2$ together may be three to five methylenes, each alk- or alkyl being of one to four carbon atoms and said aryl being phenyl or naphthyl; and the physiologically compatible salts thereof.

2. A compound as claimed in claim 1 wherein the compound is 4-[β-(3-methoxymethoxy-thenoyl-(2)-amino)-ethyl]-N-[5-isobutyl-pyrimidinyl-(2)]-benzolsulfonamide.

3. A compound as claimed in claim 1 wherein the compound is 4-[β-[3-(β-methoxyethoxy)-thenoyl-(2)-amino]-ethyl]-N-[5-isobutyl-pyrimidinyl-(2)]-benzolsulfonamide.

4. A compound as claimed in claim 1 wherein the compound is 4-[β-(3-ethoxymethoxy-thenoyl-(2)-amino)-ethyl]-N-[5-isobutyl-pyrimidinyl-(2)]-benzolsulfonamide.

5. A compound as claimed in claim 1 wherein the compound is 4-[β-[3-(β-ethoxyethoxy)-thenoyl-(2)-amino]-ethyl]-N-[5-isobutyl-pyrimidinyl-(2)]-benzolsulfonamide.

6. A compound as claimed in claim 1 wherein the compound is 4-[β-[3-(β-methoxyethoxy)-thenoyl-(2)-amino]-ethyl]-N-[5-propyl-pyrimidinyl-(2)]-benzolsulfonamide.

7. A compound as claimed in claim 1 wherein the compound is 4-[β-[3-(β-methoxyethoxy)-thenoyl-(2)-amino]-ethyl]-N-[5-cyclohexyl-pyrimidinyl-(2)]-benzolsulfonamide.

8. A compound as claimed in claim 1 wherein the compound is 4-[β-[3-(β-methoxyethoxy)-thenoyl-(2)-amino]-ethyl]-N-[5-propoxy-pyrimidinyl-(2)]-benzolsulfonamide.

9. A compound as claimed in claim 1 in the form of its alkali metal, alkaline earth metal or ammonium salt.

* * * * *